United States Patent [19]

Pilato et al.

[11] 3,862,841

[45] Jan. 28, 1975

[54] POLYMERIZATION IMAGING BY CHARGE INJECTION FROM A PHOTOCONDUCTIVE LAYER

[75] Inventors: Louis A. Pilato, Bound Brook, N.J.; Paul J. Cressman, Fairport; William W. Limburg, Penfield, both of N.Y.

[73] Assignee: Xerox Corporation, Rochester, N.Y.

[22] Filed: Sept. 15, 1969

[21] Appl. No.: 858,060

Related U.S. Application Data

[63] Continuation-in-part of Ser. No. 588,203, Oct. 20, 1966, abandoned.

[52] U.S. Cl. .................. 96/1 R, 96/35.1, 204/18 PC

[51] Int. Cl. .............................................. G03g 13/22

[58] Field of Search ............. 96/1, 35.1; 204/59, 72, 204/18 PC

[56] References Cited

UNITED STATES PATENTS

| | | | |
|---|---|---|---|
| 2,726,204 | 12/1955 | Park et al. | 204/72 |
| 2,961,384 | 11/1960 | McKinney et al. | 204/59 X |
| 3,140,276 | 7/1964 | Forster | 204/59 |
| 3,178,362 | 4/1965 | Sagura et al. | 96/1 R |
| 3,409,431 | 11/1968 | Deutsch | 96/1 X |
| 3,418,217 | 12/1968 | McMaster | 96/1 R |
| 3,419,482 | 12/1968 | Gilch | 204/59 X |
| 3,436,215 | 4/1969 | Levinos et al. | 96/1 |
| 3,437,570 | 4/1969 | Wisdom | 204/59 |

*Primary Examiner*—Roland E. Martin, Jr.
*Attorney, Agent, or Firm*—David C. Petre; Richard A. Tomlin; George J. Cannon

[57] ABSTRACT

Polymerization of monofunctional monomers and multifunctional monomers and polymers is initiated by charge injection from a photoconductive layer. No solutions containing electrolytes are required. Imagewise irradiation of the photoconductor provides a polymeric image.

10 Claims, 2 Drawing Figures

INVENTOR.
PAUL J. CRESSMAN
LOUIS A. PILATO
BY WILLIAM W. LIMBURG

ATTORNEY

POLYMERIZATION IMAGING BY CHARGE INJECTION FROM A PHOTOCONDUCTIVE LAYER

This application is a continuation-in-part of application Ser. No. 588,203, filed Oct. 20, 1966, now abandoned.

BACKGROUND OF THE INVENTION

This invention relates in general to polymerization and in particular to a polymerization imaging system.

It is known that polymerization of certain unsaturated organic compounds can be initiated by irradiation. For example, light of short enough wavelength i.e., high enough energy per quantum can initiate polymerization directly. The process of initiating polymerization with light is generally known as photopolymerization. Photopolymerization has been found to be useful in the preparation of relief plates and resists for photographic processes. The general procedure is to coat a photopolymerizable material on a substrate and expose the material to a pattern of light and shadow which causes polymerization in the light struck areas. The polymer is normally less soluble than the monomer from which it was formed, therefore a simple solvent wash is used to remove the monomer leaving a raised polymer image bonded to the substrate. Customarily, photopolymerization requires the use of ultraviolet light rays of the type emanating from sunlight or a carbon arch lamp. It has been found, however, that even though high energy radiation is used photopolymerization is a slow process requiring extensive exposure time. Many attempts have been made to increase the sensitivity of photopolymerization systems. Generally these require complex compositions containing the polymerizable materials and catalysts or initiators. See, for example, U.S. Pat. No. 3,201,237 to Cerwonka.

SUMMARY OF THE INVENTION

It is, therefore, an object of this invention to provide a system for polymerizing polymerizable unsaturated organic compounds in image configuration which overcomes the above noted disadvantages.

It is another object of this invention to provide a system for polymerizing polymerizable unsaturated organic compounds in image configuration which does not require the use of relatively high energy light sources.

It is another object of this invention to provide a system for polymerizing polymerizable unsaturated organic compounds in image configuration which does not require the use of photo initiators or catalysts.

It is another object of this invention to provide a system for polymerizing polymerizable unsaturated organic compounds in image configuration in the presence of electric field and visible light.

It is another object of this invention to provide a system for polymerizing polymerizable unsaturated organic compounds in image configuration which does not require the use of complex mixtures of polymerizable materials and initiators.

The foregoing objects and others are accomplished in accordance with this invention by a system comprising placing a liquid polymerizable unsaturated organic composition between a conductive electrode and a photoconductive electrode. The photoconductive electrode is exposed to a pattern of light and shadow. A potential difference is applied between the photoconductive electrode and the conductive electrode. Although the full mechanism of the reaction is not known, apparently the photoconductor allows a small current to flow into the polymerizable composition in light struck areas only. Polymerization is, therefore, initiated on the surface of the photoconductive electrode or on the conductive electrode in image configuration. Because a small flow of electrons apparently passes into the polymerizable mixture the process may be referred to as "charge injection polymerization". When the desired depth of polymer has been formed on the photoconductive electrode, polymerization is stopped by removing the source of the potential difference. The electrodes are then separated. The photoconductive electrode which has the polymer image bonded to it may then be flushed with a solvent to remove any unpolymerized material adhering to the surface of the polymer and electrode. The electrode with the polymer image bonded to it may then be used directly as a relief printing plate or lithographic plate. The process may also be used to produce braille type relief images.

It should be understood that for the purposes of this disclosure, by polymerization is meant addition polymerization and is intended also to include the cross-linking of polyfunctional polymers and monomers.

The photoconductor may be illuminated from either side. In one embodiment, light travels through the conductive electrode and polymerizable liquid before impinging on the photoconductive insulating layer. In the second configuration light passes through the substrate of the photoconductive member or back of the photoconductor before impinging on the surface of the photoconductive insulating layer.

The transparent conductive electrode where used and the transparent conductive substrate of the photoconductive electrode where used may be of any suitable material. Typical transparent conductive materials include conductively coated glass such as tin or indium oxide coated glass and aluminum coated glass, etc., and similar coatings on transparent plastic substrates. Nesa glass (A tin-oxide coated glass available from the Pittsburgh Plate Glass Co.) is preferred because it is chemically inert and readily available.

Wherein a transparent conductive electrode is not required or where a transparent substrate on the photoconductive electrode is not required the electrode or substrate material may be of any suitable conductive material. Typical conductive materials are: aluminum, magnesium, brass, steel, copper, nickle, zinc, etc., conductively coated glass such as tin or indium oxide coated glass, aluminum coated glass, similar coatings on plastic substrates or paper rendered conductive by the inclusion of a suitable chemical therein or through conditioning in a humid atmosphere to insure the presence therein of sufficient water content to render the material conductive. Aluminum is preferred because of its high conductivity and because it is readily available.

The conductive electrode should be relatively inert to the polymerizable composition and the photoconductive material should be relatively inert to the polymerizable composition and to the solvent used to flush away unpolymerized materials.

Any suitable photoconductive insulating layer material may be used. Typical photoconductive materials include inorganic photoconductors such as zinc oxide, cadmium sulfide, zinc sulfide, lead sulfide, cadmium selenide, selenium, lead iodide, lead chromate, and mixtures thereof; organic photoconductors such as phthalocyanine binder plates as described in copending application Ser. No. 518,450 filed Jan. 3, 1966, triphenyl amine; 2,4-bis (4,4-diethylaminophenyl)-1,3,4-oxadiazole; N-isopropyl carbazole; triphenyl pyrrol; 4,5-diphenylimidazolidinone; 1,4-dicyano naphthalene; 2-mercapto-benz-thiazole, 2,4-diphenylquinazoline; 5-benzidene-amino-acenaphthalene and mixtures thereof. These materials may be used as the photoconductive layer by themselves or in a suitable binder. Phthalocyanine is preferred because of its high sensitivity to light. Typical binders are selenium, polystyrene resins, silicone resins, acrylic and methacrylic polymers and copolymers and mixtures thereof.

Any suitable unsaturated organic monomer or polymer or mixtures thereof may be used. Typical monofunctional monomers include: N-vinylphthalimide, or N-vinylcarbazole dissolved in, for example, acetonitrile or acrylonitrile, N-vinylpyrrolidone, methyl methacrylate, acrylates such as ethyl acrylate, butyl, acrylate, acrylate esters and mixtures thereof. Typical unsaturated multifunctional monomers include: (di), (tri), (tetra), ethylene glycol dimethacrylate, bis (p-methoxy benzal) acetone azine, bis (p-N,N'-dimethylaminobenzylidene) acetone, neopentyl glycol dimethacrylate, hexamethylene-bis-acrylamide, divinyl benzene, allyl methacrylamide, bisphenol A-dimethacrylate, N-N'-methylene bisacrylamide, (di), (tri), (tetra), ethylene glycol acrylate, neopentyl glycol diacrylate, bisphenol A-diacrylate, $\alpha$, $\beta$ unsaturated ketones (chalcones) and mixtures thereof.

Typical multifunctional unsaturated polymers include: bis-acrylates and methacrylates of polyethylene glycols, such as polyethylene glycol dimethacrylate; unsaturated esters of polyols, condensation products of 4'-($\beta$-hydroxyethoxy)-chalcone with a styrene/maleic-anhydride copolymer or other maleic anhydride copolymers and mixtures thereof. Other typical multifunctional unsaturated monomers and polymers are disclosed at column 8, line 43 through column 9, line 15 of U.S. Pat. No. 3,060,025 to Burg, Muchen, and Cohen. A mixture of about 7 parts ethylene glycol dimethacrylate (EGDMA) and about 3 parts of Atlas 1086 (bisphenol A-epichlorohydrin esterified with fumaric acid, available from Atlas Chemical Inductries, Inc., Wilmington, Delaware) is preferred because it polymerizes readily at a relatively low applied potential. EGDMA is a polymerizable multifunctional monomer, that is, it is a monomer which has more than one site of unsaturation and is therefore capable of rapidly cross-linking the Atlas 1086. Atlas 1086 is a low molecular weight multifunctional polymerizable material which does not require extensive cross-linking before it forms an insoluble resin with EGDMA.

Although the use of higher energy light such as ultraviolet may result in faster polymerization the use of incandescent light is more convenient and allows a more accurate control over the extent of polymerization. Normally the light source remains activated throughout the polymerization i.e., potential application, however, certain photoconductors such as zinc oxide remain conductive for a period of time after the light exposure is terminated, which would allow polymerization to be continued beyond the time of exposure. It is, therefore, possible to provide a system wherein the time of exposure to the light image is relatively short, that is, only of sufficient time to render the photoconductive layer conductive in image configuration. The exposure may take place as shown in FIGS. 1 and 2, alternatively the photoconductive electrode may be exposed separately and then placed in the cell. Potential application would then result in imagewise polymerization without additional exposure to a light image. The advantage of this embodiment is that neither electrode would have to be at least partially transparent.

The preferred potential difference is dependent on the thickness of the polymer composition, higher potentials being required for thicker compositions. For a 10 mil thickness a potential source of approximately 1,000 volts DC is preferred across the polymerizable composition. A higher potential than 1,500 volts would result in faster polymerization, however, control of the extent of polymerization would not be as accurate. The potential difference can be increased to increase the rate of polymerization, being limited by the breakdown voltage of the polymerizable composition.

BRIEF DESCRIPTION OF THE DRAWINGS

The advantages of this improved method of polymerizing a polymerizable unsaturated organic composition in image configuration will become apparent upon consideration of the detailed disclosure of the invention especially when taken in conjunction with the accompanying drawings, wherein:

Referring now to FIG. 1, an aluminum substrate 2 having a vitreous selenium layer 3 on its surface is used as the photoconductive electrode 1. An inert gasket 4 is placed over photoconductive electrode 1. The shallow cup formed by gasket 4 and photoconductive electrode 1 is filled with a polymerizable composition 5. A transparent conductive electrode 6 is placed in contact with polymerizable composition 5 and gasket 4. A transparency 7 containing an image is placed on top of electrode 6. A source of incandescent light 8 is placed over transparency 7 and activated. A source of potential difference 9 is then attached to electrodes 1 and 6. The conductive electrode 6 is made the positive electrode in the cell. Potential is applied until the desired depth of polymer 10 is obtained. Polymer 10 is formed on those areas of electrode 1 on which light impinges. The electrodes are then separated and electrode 1 having polymer image 10 bonded to it is flushed with acetone. The photoconductive electrode 1 with polymer 10 bonded to it in image configuration may then be used as a relief printing plate by bringing it in contact with a surface bearing wet ink. The image is then transferred to paper by pressing the inked polymer against the paper.

Referring now to FIG. 2, an aluminum plate is used as the conductive electrode 11. An inert gasket 12 is placed over conductive electrode 11. The shallow cup formed by gasket 12 and conductive electrode 11 is filled with a polymerizable composition 13. Nesa glass 16 is used as the substrate of the photoconductive electrode 14. The photoconductive electrode 14 is prepared by vacuum depositing a vitreous selenium layer 15 to the surface of substrate 16. The photoconductive member 14 is placed in contact with polymerizable composition 13 and gasket 12. A transparency 17 containing an image is placed over photoconductive electrode 14. A source of incandescent light 18 is placed above the transparency and activated. A source of potential difference 19 is then attached to electrodes 10 and 14. Photoconductive electrode 14 is made the negative electrode in the cell. The potential is applied until the desired depth of polymer 20 is obtained. The electrodes are then separated and photoconductive electrode 14 flushed with acetone. Photoconductive electrode having polymer 20 bonded to it in image configuration may then be used as a relief printing plate.

DESCRIPTION OF THE PREFERRED EMBODIMENTS

Figure 1:
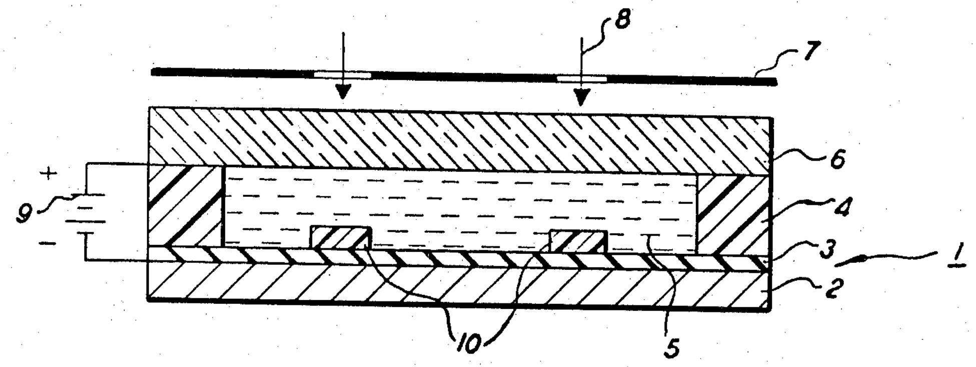
FIG. 1 shows a sectional side view of a simple exemplary system for carrying out the process of this invention wherein light passes through the conductive electrode and polymerizable composition before striking the surface of the photoconductive layer.
Figure 2:
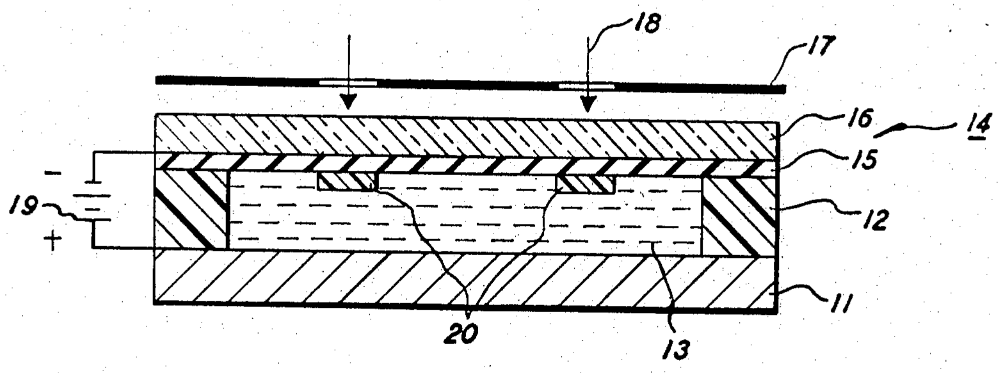
FIG. 2 shows a sectional side view of a simple exemplary system for carrying out the process of this invention wherein light passes through the substrate of the photoconductive member before striking the photoconductive layer.

The following examples further specifically illustrate the present invention. The examples below are intended to illustrate the various preferred embodiments of the improved polymerization method. The parts and percentages are by weight unless otherwise indicated.

EXAMPLE I

A 2 inch square by a one-sixteenth inch thick aluminum plate is prepared by placing a photoconductive phthalocyanine binder layer on its surface as follows: about 5 parts Pyre ML-RK-692 (12% solids) an aromatic polyimide resin available from E. I. duPont deNemours & Co. is dissolved in about 6 parts dimethylformamide. About 1 part finely divided Monolite Fast Blue G.S. (alpha-form metal-free phthalocyanine available from Arnold Hoffman Co.) is then added to the solution. The liquid is then painted on the aluminum plate to produce a uniform coating of about 10 microns. The coated aluminum plate is then heat treated at about 200°C. for about 1 hour to cure the photoconductive layer.

This coated plate constitutes the photoconductive electrode. A 10 mil thick Teflon (polytetrafluoroethylene available from E. I. duPont deNemours & Co.) gasket having a 2 inch square hole is placed over the photoconductive electrode. The 10 mil deep cup formed by the Teflon gasket and photoconductive electrode is filled with a polymerizable composition consisting of about 7 parts of ethylene glycol dimethacrylate and about 3 parts of Atlas 1086. A 2 inch square by one-eighth inch thick Nesa plate is then placed in contact with the Teflon gasket and mixture of polymerizable materials. This electrode is referred to as the conductive electrode. An image bearing transparency is then placed over the conductive electrode. A source of incandescent light is placed above the transparency and is activated. The light is projected by a Bell and Howell Duo-liner projector using a 115–120 volt, 300 watt tungsten filament CYC projector lamp available from General Electric Co. The total distance from the projector lamp to the polymerizable composition is approximately 18 inches. A potential source of about 1,500 volts DC is connected to the two electrodes. The photoconductive electrode is made the negative electrode in the cell. Polymerization is observed to be initiated on the surface of the photoconductor in the light struck areas only. Potential application is continued for 2 minutes. The photoconductive electrode is then removed from the cell and the polymer image bonded to it flushed with acetone.

EXAMPLE II

The experiment of Example I is repeated wherein a mixture of about 5 parts of neopentyl glycol dimethacrylate and about 1 part of bis (p-methoxybenzal) acetone azine is used as the polymerizable composition. The photoconductive electrode is then removed from the cell and flushed with acetone. The photoconductive electrode is observed to have polymer bonded to it in image configuration.

EXAMPLE III

The experiment of Example I is repeated wherein a mixture of about 5 parts of polyethylene glycol dimethacrylate and about 1 part of bis (p-methoxybenzal) acetone azine is used as the polymerizable composition. The photoconductive electrode is then removed from the cell and flushed with acetone. The photoconductive electrode is observed to have polymer bonded to it in image configuration.

EXAMPLE IV

The experiment of Example I is repeated wherein the polymerizable composition comprises 2,4-dicyano butene-1. The photoconductive electrode is then removed from the cell and flushed with acetone. The photoconductive electrode is observed to have polymer bonded to it in image configuration.

EXAMPLE V

A 2 inch square by one-sixteenth inch thick aluminum plate having about a 50 micron layer of selenium vacuum deposited on its face is used as the photoconductive electrode. A 10 mil thick Teflon gasket having a 2 inch square hole is placed over the photoconductive electrode. The 10 mil deep cup formed by the Teflon gasket and photoconductive electrode is filled with a polymerizable composition consisting of about 7 parts of neopentyl glycol dimethacrylate and about 3 parts of Atlas 1086. A 2 inch square by one-eighth inch thick Nesa glass plate is placed in contact with the polymerizable composition and Teflon gasket. An image bearing transparency is placed over the conductive electrode. The source of incandescent light described in Example I is positioned above the transparency and activated. A potential source of about 1,500 volts DC is attached to the two electrodes. The photoconductive electrode is made the negative electrode in the cell. The potential is applied for about 2 minutes. The photoconductive electrode is then removed from the cell and flushed with acetone. The photoconductive electrode is observed to have polymer bonded to it in image configuration.

EXAMPLE VI

The experiment of Example V is repeated wherein a mixture of about 7 parts of polyethylene glycol dimethacrylate and about 2 parts of bis (p-methoxybenzal) acetone azine is used as the polymerizable composition. The photoconductive electrode is then removed from the cell and flushed with acetone. The photoconductive electrode is observed to have polymer bonded to it in image configuration.

EXAMPLE VII

The experiment of Example V is repeated wherein a mixture of about 7 parts of neopentyl glycol dimethacrylate and about 2 parts of bis (p-methoxybenzol) acetone azine is used as polymerizable composition. The photoconductive electrode is then removed from the cell and flushed with acetone. The photoconductive electrode is observed to have polymer bonded to it in image configuration.

EXAMPLE VIII

The experiment of Example V is repeated wherein the polymerizable composition comprises 2,4-dicyanobutene-1. The photoconductive electrode is then removed from the cell and flushed with acetone. The photoconductive electrode is observed to have polymer bonded to it in image configuration.

EXAMPLE IX

A 2 inch square by one-sixteenth inch thick aluminum plate is used as the conductive electrode. A 10 mil thick Teflon gasket having a 2 inch square hole is placed over the conductive electrode. The 10 mil deep cup formed by the Teflon gasket and conductive electrode is filled with a polymerizable mixture consisting of about 7 parts of ethylene glycol dimethacrylate and about 2 parts bis (p-methoxy-benzal) acetone azine. A photoconductive electrode is prepared by vacuum depositing about a 0.2 micron layer of selenium on a 2 inch square by one-eighth inch thick Nesa glass plate. This photoconductive electrode is placed over the polymerizable composition and Teflon gasket. An image bearing transparency is placed over the photoconductive electrode. The light source as described in Example I is positioned above the transparency and activated. A potential difference of about 1,500 volts DC is placed across the electrodes. Potential application is continued for about 2 minutes. The photoconductive electrode is then removed from the cell and flushed with acetone. The photoconductive electrode is observed to have polymer bonded to it in image configuration.

EXAMPLE X

The experiment of Example IX is repeated wherein a mixture of about 7 parts of neopentyl glycol dimethacrylate and about 2 parts of bis (p-methoxybenzal) acetone azine is used as the polymerizable composition. The photoconductive electrode is then removed from the cell and flushed with acetone. The photoconductive electrode is observed to have polymer bonded to it in image configuration.

EXAMPLE XI

The experiment of Example IX is repeated wherein a mixture of about 7 parts of neopentyl glycol dimethacrylate and about 3 parts of Atlas 1086 is used as the polymerizable composition. The photoconductive electrode is then removed from the cell and flushed with acetone. The photoconductive electrode is observed to have polymer bonded to it in image configuration.

EXAMPLE XII

The experiment of Example I is repeated except that a 36 mil Teflon spacer is used and 800 volts is applied. The polymerizable composition consists of methyl methacrylate. A polymeric relief image is found adhering to the photoconductive electrode.

EXAMPLE XIII

The experiment of Example XII is repeated except that the polymerizable composition consists of acrylonitrile and 1,000 volts is applied. A polymeric image is found adhering to the photoconductive electrode.

EXAMPLE XIV

The experiment of Example XIII is repeated except that the photoconductor is made the positive electrode. A polymeric image is found adhering to the photoconductive electrode.

EXAMPLE XV

The experiment of Example XIV is repeated except that about 1 part of N-vinylcarbazole dissolved in about 4 parts acrylonitrile is used as the polymerizable composition. A polymer image is found adhering to the surface of the photoconductor.

Although specific components and proportions have been stated in the above description of preferred embodiments of the invention other typical materials as listed above, where suitable, may be used with similar results. In addition, other materials may be added to the mixture to synergize, enhance or otherwise modify the properties of the electrodes and the polymerizable mixture. For example, a diaphragm may be placed between the electrodes to prevent migration of polymer to the positive electrode.

Other modifications and ramifications of the present invention will occur to those skilled in the art upon a reading of the disclosure. These are intended to be included within the scope of this invention.

What is claimed is:

1. An imaging process comprising the steps of:

a. providing a photoconductive layer;

b. placing on a surface of said photoconductive layer a polymerizable composition consisting essentially of unsaturated vinyl containing compounds capable of undergoing liquid to solid addition polymerization in response to charge injection from said photoconductive layer;

c. exposing said photoconductive layer to a pattern of electromagnetic radiation to which said photoconductive layer is sensitive; and d. applying an electrical field across said photoconductive layer and said polymerizable composition until an image is formed.

2. The process of claim 1 wherein the polymerizable composition comprises a mixture of polyethylene glycol dimethacrylate and bisphenol A-epichlorohydrin esterfied with fumaric acid.

3. The process of claim 1 wherein the polymerizable composition comprises a mixture of neopentyl glycol dimethacrylate and bisphenol A-epichlorohydrin esterified with fumaric acid.

4. The process of claim 1 wherein the polymerizable composition comprises a mixture of ethylene glycol dimethacrylate and bisphenol A-epichlorohydrin esterified with fumaric acid.

5. The process of claim 1 wherein the polymerizable composition comprises a mixture of neopentyl glycol dimethacrylate and bis (p-methoxybenzal) acetone azine.

6. The process of claim 1 wherein the photoconductive layer comprises vitreous selenium.

7. The process of claim 1 wherein the photoconductive layer comprises phthalocyanine.

8. The process of claim 1 wherein the photoconductive layer comprises phthalocyanine dispersed in a binder.

9. The process of claim 1 wherein the photoconductive layer comprises zinc oxide dispersed in a binder.

10. The method of claim 1 wherein step d occurs subsequent to step c.

* * * * *